ALEXANDER E. MARTENS
INVENTOR.

ALEXANDER E. MARTENS
INVENTOR

BY Charles C. Krauczyk

ATTORNEY

ALEXANDER E. MARTENS
INVENTOR.

United States Patent Office 3,445,664
Patented May 20, 1969

3,445,664
TEMPERATURE COMPENSATING CIRCUIT FOR PHOTOMULTIPLIER TUBES
Alexander E. Martens, Greece, N.Y., assignor to Bausch & Lomb Incorporated, Rochester, N.Y., a corporation of New York
Filed June 5, 1967, Ser. No. 643,661
Int. Cl. H01j 39/02, 39/10
U.S. Cl. 250—207                                  11 Claims

ABSTRACT OF THE DISCLOSURE

A temperature compensating bridge circuit, including a temperature sensitive element, is coupled to a control electrode of a photoelectric device. The bridge circuit includes two potentiometers for matching the temperature compensating action of the bridge circuit to the characteristics of the connected photoelectric device.

FIELD OR THE INVENTION

This invention relates to temperature compensating circuits for stabilizing the operation of photoelectric devices.

SUMMARY OF THE INVENTION

It is well known that the sensitivity of photosensitive devices changes with temperature. The temperature compensating circuit of the invention generates a control signal that substantially matches the temperature vs. sensitivity characteristics of the devices. The control signal is applied to the device in a manner to maintain the sensitivity of the device substantially constant over the normal operating range of the device.

The temperature compensating circuit of the invention comprises a variable bridge circuit, including a temperature sensitive element, such as a thermistor, connected in one of the legs of the bridge circuit. The bridge circuit is connected to a control electrode of a photoelectric device, such as a dynode of a photomultiplier tube or a gate of a photoelectric field-effect transistor, to apply a temperature compensating control signal thereto. The bridge circuit is adjustable to match the temperature variations of the photoelectric device to thereby stabilize the long term temperature stability of the device.

DESCRIPTION OF THE PREFERRED EMBODIMENTS

It is well-known that the sensitivity of photoelectric devices, such as photomultiplier tubes and photoelectric field-effect transistors, decreases with increasing temperatures. This is particularly troublesome when long term stability is required of circuits employing such photoelectric devices. Since the temperature dependent drift of photoelectric field-effect transistors and photomultiplier tubes varies widely between individual devices, it is extremely difficult to predict the exact temperature compensation that must be applied thereto. Accordingly, a temperature compensating circuit should incorporate means for matching the characteristics of the circuit to that of the particular photoelectric device employed.

Figure 1:
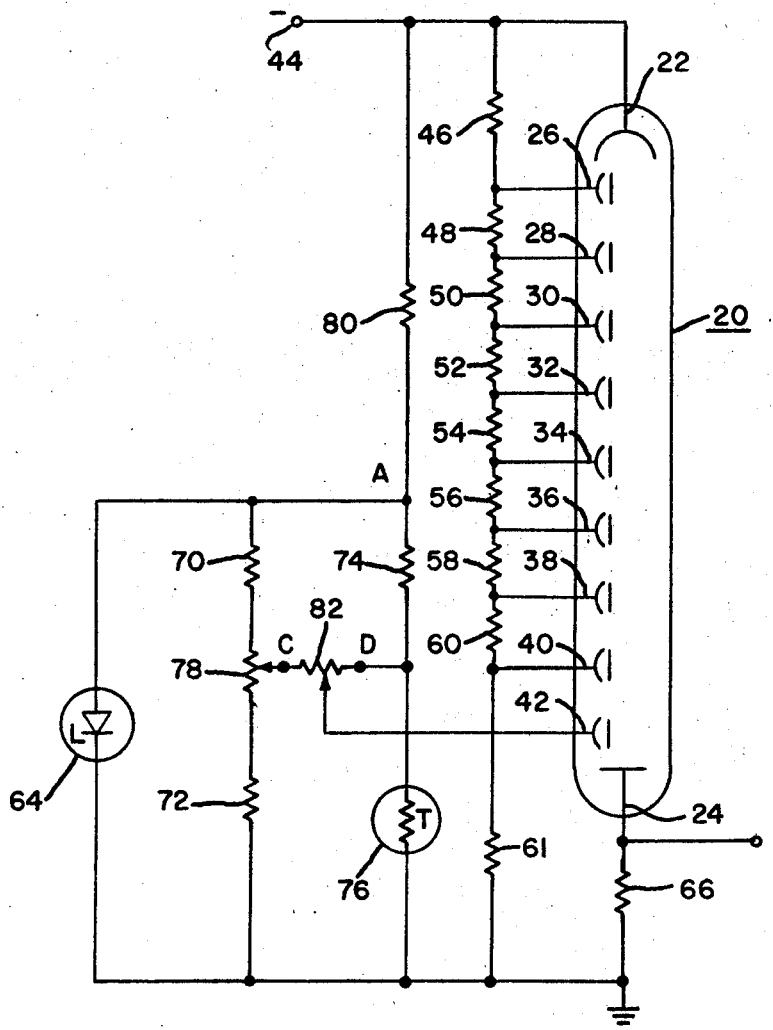
FIGURE 1 is an electrical schematic diagram of a photomultiplier tube circuit including the temperature compensating circuit of the invention.

The photoelectric device in FIGURE 1 is a photomultiplier tube 20 including a photocathode 22 (electron emitting element in response to radiation applied thereto) a plurality of dynodes 26–42 (current amplifying electrodes) and an anode 24 (current collecting electrode). A source of energizing potential (not shown) is adapted to be connected between a power supply terminal 44 and ground. The photocathode 22 is directly connected to the terminal 44. The biasing circuit for the dynodes 26–40 comprises a voltage divider circuit including the resistors 46–61 connected in a series circuit between the power supply terminal 44 and ground. The dynodes 26–40 are connected to the voltage divider circuit so that the dynode 26 receives the highest biasing potential (with respect to ground) and the following dynodes 28–40 receive successively lower biasing potentials. The anode 24 is connected to ground through a resistor 66.

A temperature compensating biasing potential developed by the temperature compensating circuit of the invention is applied to the last dynode 42. The temperature compensating circuit includes a bridge circuit having resistors 70, 72 and 74 forming three legs of the bridge circuit and a temperature sensitive element 76, such as a thermistor, forming the fourth leg. A potentiometer 78 is coupled between the bridge circuit legs including the resistors 70 and 72. The bridge circuit is connected at one end to ground and at the other end through a resistor 80 to the power supply terminal 44. A Zener diode 64 is connected across the bridge circuit to stabilize the energizing potential applied to the bridge circuit.

One end of a potentiometer 82 is connected to the movable arm or wiper of the potentiometer 78 and the other end to the junction of the resistor 74 and the thermistor 76. The wiper of the potentiometer 82 is connected to the dynode 42 for applying a temperature compensating biasing voltage thereto.

Figure 2:
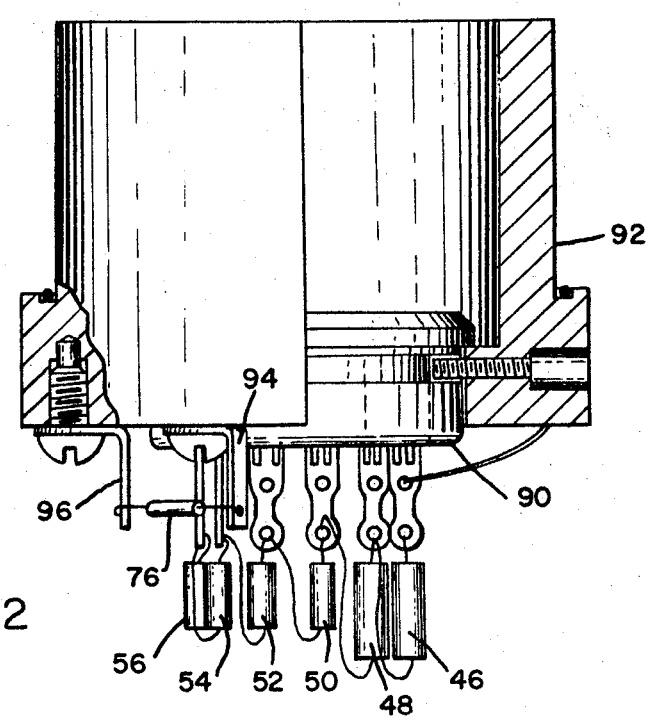
FIGURE 2 is a partial cross-sectional view of a photomultiplier tube base including the temperature sensitive element of the FIGURE 1.
Figure 3:
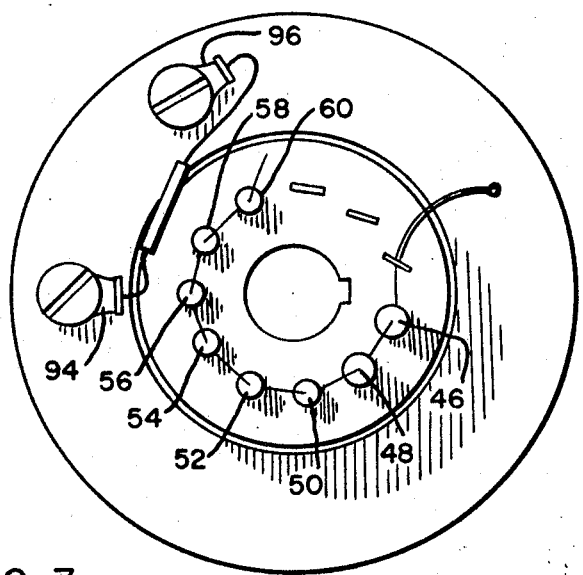
FIGURE 3 is a bottom view of FIGURE 2.

It has been found that the temperature in the vicinity of the photomultiplier tube pins provides a relatively good measurement of the temperature at which the photomultiplier tube is operating. Hence, the temperature sensitive element 76 may be positioned close to the photomultiplier tube pins (as illustrated in FIGURES 2 and 3) to develop an electrical signal in the bridge circuit to compensate for variations in the photomultiplier tube sensitivity due to changes in its operating temperature. It is to be understood, however, that the temperature sensitive element 76 may be placed in other convenient positions to sense the operating temperature of the photomultiper tube.

In FIGURES 2 and 3 a photomultiplier tube socket 90 is suitably mounted in an insulating base 92 for receiving the photomultiplier tube and providing electrical connections to the tube elements. The resistors of the voltage divider of FIGURE 1 are mounted about the terminals of the socket 90. The thermistor 76 is mounted between two lugs 94 and 96 fastened to the base 92. In this particular location the thermistor 76 monitors the operating temperature of the photomultiplier tube and generates a corresponding electrical signal. It is to be understood that FIGURES 2 and 3 are merely an illustration of how the thermistor can be mounted adjacent to the photomultiplier tube pins and that the thermistor 76 can be mounted in a different manner and in other temperature sensitive locations and still provide the desired temperature responsive electrical signal.

The temperature compensating bridge circuit is adjusted to match the particular characteristics of the connected photomultiplier tube in a simple two-step procedure. The photomultiplier tube is inserted into the socket 90 and a reference beam of radiation having a predetermined intensity is applied thereto. The magnitude of the power supply voltage applied to the terminal 44 is adjusted to produce the desired photomultiplier tube sensitivity. The bridge circuit is now balanced by the setting of the wiper of the potentiometer 82 at point D, and measuring the voltage developed across the resistor 66. The wiper of the potentiometer 82 is subsequently moved to point C and the wiper of the potentiometer 78 is readjusted until the output voltage across the resistor 66 is restored to the prior measured value.

The equipment is subsequently allowed to warmup to its normal operating temperature at a given ambient temperature. Once up to normal operating temperature and with the same light intensity applied to the tube, the movable arm of the potentiometer 82 adjusted to reset the prior measured voltage level across the resistor 66. It should be noted that the potentiometer 78 is not adjusted after warm-up. Accordingly, the temperature compensating characteristic of the bridge circuit is now matched to the connected photomultiplier tube. The temperature compensating circuit now functions to stabilize the sensitivity of the photomultiplier tube over the usual range of operating temperatures.

Figure 4:
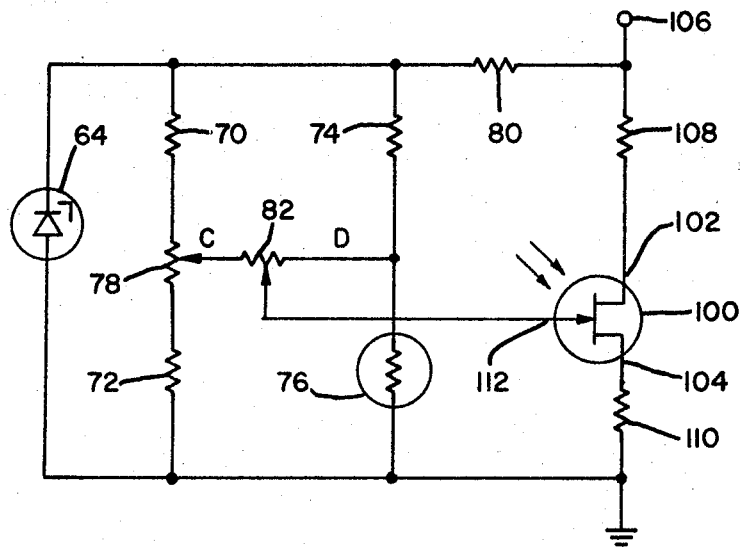
FIGURE 4 is a schematic diagram of a photoelectric field-effect transistor circuit including the temperature compensating circuit of the invention.

In FIGURE 4, the temperature compensating circuit of the invention is connected to stabilize the sensitivity of a photoelectric field-effect transistor 100. For purposes of simplification the same elements in the temperature compensating circuit of FIGURES 1 and 4 are designated by the same reference numerals.

The source and drain electrode 102 and 104 of the field-effect transistor 100 are connected in between a power supply terminal 106 and ground through a pair of resistors 108 and 110. A gate electrode 112 is connected to the wiper of the potentiometer 82. The resistor 80 is connected between the bridge circuit and the power supply terminal 106 to apply the energizing potential thereto. The temperature compensating element 76 can be suitably located adjacent the photoelectric field-effect transistor 110 or physically connected thereto to sense the operating temperature of the device.

The temperature compensating action of the bridge circuit effectively functions as set forth with regards to FIGURE 1. The bridge circuit is adjusted to match its temperature compensating action to the characteristics of the photoelectric field-effect transistor in the manner previously set forth with regards to FIGURE 1. The measurements of the sensitivity field-effect transistor 100 can be made by measuring the voltage at either the drain or source electrodes.

Either positive or negative temperature coefficient thermistors can be utilized as the temperature sensitive element 76 of the bridge circuit. The circuits of FIGURES 1 and 4 includes a negative coefficient thermistor wherein the resistance of the device decreases as the temperature increases. Hence, as the temperature increases the voltage at point D becomes increasingly positive with respect to the cathode of the photomultiplier tube 20 or the drain 104 of the field-effect transistor 100. The sensitvity of the photomultiplier tube depends (among other factors) upon the potential drop between dynodes 40 and 42. The compensating network therefore functions to vary the potential at the dynode 42 without affecting the voltages on the other dynodes 26–40. The sensitivity of the photoelectric field-effect transistor is controlled by adjusting the bias between the gate and drain electrodes 112 and 104. An approximately slope of the compensation characteristic of the bridge circuit is selected by adjusting the potentiometer 82 since the maximum variation of the potential applied to the dynode 42 or gate electrode 112 occurs with the wiper of the potentiometer 82 at point D and a minimum at point C. Accordingly, any value therebetween can be selected. The temperature compensating circuit thereby provides a two-point approximation to reduce the changes in photoelectric device sensitivity due to temperature variation over the normal operating range of the equipment to a value that can be neglected and thereby provides a substantial improvement in the long term operational stability of the photoelectric circuit.

What is claimed is:

1. An electrical circuit comprising:
    a radiation sensitive device including an emitting electrode for generating an electrical current in response to radiation applied thereto, a plurality of amplifying electrodes for amplifying said current flow and a collecting electrode receiving said amplified current;
    a pair of terminals for connection to a source of energizing potential coupled to said emitting and collecting electrodes;
    biasing means coupled to said pair of terminals providing a plurality of potentials of successively decreasing magnitudes;
    first circuit means coupled to apply said plurality of potentials to selected ones of said plurality of amplifying electrodes;
    a variable bridge circuit including a temperature sensitive element;
    second circuit means for energizing said bridge circuit, and
    third circuit means coupling said bridge circuit to at least one of said amplifying electrodes.

2. An electrical circuit as defined in claim 1 wherein:
    said radiation sensitive device comprises a photomultiplier tube including a photocathode, an anode and a plurality of dynodes corresponding to said emitting, collecting and amplifying electrodes respectively, and
    wherein said third circuit means couples said bridge circuit to at least one dynode.

3. An electrical circuit as defined in claim 2 wherein said bridge circuit comprises:
    a first potentiometer connected between two legs of the bridge circuit,
    a second potentiometer connected across said bridge circuit, and
    said third circuit means couples the movable arm of said second potentiometer to the dynode adjacent said anode.

4. An electrical circuit as defined in claim 2 wherein said bridge circuit comprises a first side including two resistors and a first potentiometer connected in series, a second side including a resistor and said temperature sensitive element connected in series;
    a second potentiometer coupled between said first and second sides of said bridge circuit and
    said third circuit means couples the movable arm of said second potentiometer to the dynode adjacent said anode.

5. An electrical circuit as defined in claim 4 wherein said temperature sensitive element is mounted adjacent the pins of said photomultiplier tube.

6. A temperature compensating circuit for a photoelectric device including first and second electrodes and at least one control electrode for controlling the current flow between said first and second electrodes comprising:
    a bridge circuit including a temperature compensating element in one leg and a first potentiometer coupled between two legs;
    circuit means for applying an energizing potential to said bridge circuit;
    a second potentiometer coupled across said bridge circuit, and
    circuit means coupling said second potentiometer to a control electrode of said photoelectric device.

7. A temperature compensating circuit as defined in claim 6 wherein:
    said bridge circuit includes three resistive elements and a temperature sensitive element as the four legs of the bridge circuit and said first potentiometer is coupled between two of said elements;
    said second potentiometer is coupled between the movable arm of said first potentiometer and the junction of the elements of said bridge circuit legs other than that coupled to said first potentiometer, and said circuit means coupling said second potentiometer to said control electrodes connects the movable arm of said second potentiometer to said control electrode.

8. A temperature compensating circuit for a photomultiplier tube circuit including a voltage divider circuit coupled to a plurality of dynode electrodes of said photomultiplier tube comprising:

a bridge circuit including a temperature compensating element in one leg and a first potentiometer coupled between two legs;

circuit means for applying an energizing potential to said bridge circuit;

a second potentiometer coupled across said bridge circuit, and circuit means coupling said second potentiometer to at least one of said dynode electrodes.

9. A temperature compensating circuit as defined in claim 8 wherein:

said bridge circuit includes three resistance elements and a temperature sensitive element as the four legs of the bridge circuit and said first potentiometer is coupled between two of said elements, and said second potentiometer is coupled between the movable arm of said first potentiometer and the junction of the elements of said bridge circuit legs other than that coupled to said first potentiometer.

10. A temperature compensating circuit as defined in claim 9 wherein said circuit means couples the movable arm of said second potentiometer to the dynode element adjacent said anode.

11. A temperature compensating circuit as defined in claim 10 wherein said temperature sensitive element is mounted adjacent a base for receiving the pins of said photomultiplier tube.

References Cited

UNITED STATES PATENTS

| | | | |
|---|---|---|---|
| 2,653,247 | 9/1953 | Lundahl | 250—207 X |
| 3,171,032 | 2/1965 | Holt | 250—207 |
| 3,184,597 | 5/1965 | Scherbatskoy | 250—207 X |
| 3,218,560 | 11/1965 | Scherbatskoy | 250—207 X |

JAMES W. LAWRENCE, *Primary Examiner.*

C. R. CAMPBELL, *Assistant Examiner.*

U.S. Cl. X.R.

307—310